(12) United States Patent
Dodderi et al.

(10) Patent No.: US 8,676,388 B2
(45) Date of Patent: Mar. 18, 2014

(54) INTELLIGENT CORE ENGINE

(75) Inventors: Ruchali Dodderi, Maharashtra (IN);
Pankaj Ghanshyam Ingle, Maharashtra (IN); Hrishikesh Ravindra Dok, Maharashtra (IN); Manish Lalwani, Maharashtra (IN); Vijaykumar Marotirao Mahajan, Maharashtra (IN)

(73) Assignee: Accenture Global Services Limited, Dublin (IE)

( * ) Notice: Subject to any disclaimer, the term of this patent is extended or adjusted under 35 U.S.C. 154(b) by 314 days.

(21) Appl. No.: 13/191,305

(22) Filed: Jul. 26, 2011

(65) Prior Publication Data
US 2012/0029710 A1 Feb. 2, 2012

(30) Foreign Application Priority Data
Jul. 30, 2010 (IN) .............. 2171/CHE/2010

(51) Int. Cl.
*G06F 1/28* (2006.01)
(52) U.S. Cl.
USPC .............................. 700/286; 700/295; 702/62
(58) Field of Classification Search
USPC ........ 700/22, 286, 295, 297, 298; 702/60, 61, 702/62; 705/412
See application file for complete search history.

(56) References Cited

U.S. PATENT DOCUMENTS

| | | | |
|---|---|---|---|
| 5,455,776 A | 10/1995 | Novosel | |
| 5,923,269 A | 7/1999 | Shuey et al. | |
| 6,819,098 B2 * | 11/2004 | Villicana et al. | 340/870.02 |
| 6,845,333 B2 | 1/2005 | Anderson et al. | |
| 7,043,340 B2 | 5/2006 | Papallo et al. | |
| 7,096,175 B2 | 8/2006 | Rehtanz et al. | |
| 7,107,162 B2 | 9/2006 | Zima et al. | |
| 7,200,500 B2 | 4/2007 | Larsson et al. | |
| 7,233,843 B2 | 6/2007 | Budhraja et al. | |

(Continued)

FOREIGN PATENT DOCUMENTS

GB 2 442 114 3/2008
WO WO 2008/155545 A2 12/2008

(Continued)

OTHER PUBLICATIONS

Ballance, John et al., "*Use of Synchronized Phasor Measurement System for Enhancing AC-DC Power System Transmission Reliability and Capability*," EIPP meeting, naspi.org, 12 pages (Sep. 2004).

(Continued)

*Primary Examiner* — Charles Kasenge
(74) *Attorney, Agent, or Firm* — Nathan O. Greene; Brinks Gilson & Lione

(57) ABSTRACT

A central management authority for a system, such as a power utility system, is disclosed. The central management authority communicates with a plurality of meter data management systems and with a plurality of headend systems, the meter data management systems generating commands and the headend systems communicating with one or more meters (such as one or more smart meters). The central management authority includes a gateway layer and a core layer. The gateway layer includes a plurality of input connector routines to communicate with each of the plurality of source systems and a plurality of output connector routines to communicate with each of the plurality of target systems. The core layer includes a plurality of core adapters, with the core adapters performing a one-to-one translation of communications from the plurality of meter data management systems generating commands to the plurality of the head end systems.

18 Claims, 8 Drawing Sheets

(56) References Cited

U.S. PATENT DOCUMENTS

| | | | |
|---|---|---|---|
| 7,283,915 | B2 | 10/2007 | Saha et al. |
| 7,689,323 | B2 | 3/2010 | Mansingh et al. |
| 7,739,138 | B2 | 6/2010 | Chauhan et al. |
| 7,853,417 | B2* | 12/2010 | Vaswani et al. ............. 702/60 |
| 7,953,519 | B2* | 5/2011 | Hamilton et al. ............ 700/295 |
| 8,269,649 | B2* | 9/2012 | Cornwall ............... 340/870.02 |
| 8,310,341 | B2* | 11/2012 | Cornwall et al. ............ 340/9.14 |
| 8,374,729 | B2* | 2/2013 | Chapel et al. ................ 700/295 |
| 2001/0039537 | A1 | 11/2001 | Carpenter et al. |
| 2002/0027504 | A1 | 3/2002 | Davis et al. |
| 2002/0103772 | A1 | 8/2002 | Chattopadhyay |
| 2002/0107615 | A1 | 8/2002 | Bjorklund |
| 2003/0169029 | A1 | 9/2003 | Piesinger |
| 2004/0263147 | A1 | 12/2004 | Piesinger |
| 2005/0160128 | A1 | 7/2005 | Fardanesh |
| 2005/0165511 | A1* | 7/2005 | Fairlie .......................... 700/286 |
| 2006/0208571 | A1* | 9/2006 | Fairlie .......................... 307/11 |
| 2006/0224336 | A1 | 10/2006 | Petras et al. |
| 2006/0247874 | A1 | 11/2006 | Premerlani et al. |
| 2006/0259255 | A1 | 11/2006 | Anderson et al. |
| 2007/0086134 | A1 | 4/2007 | Zweigle et al. |
| 2007/0205915 | A1 | 9/2007 | Shuey et al. |
| 2008/0049619 | A1 | 2/2008 | Twiss |
| 2008/0071482 | A1 | 3/2008 | Zweigle et al. |
| 2008/0150544 | A1 | 6/2008 | Premerlani et al. |
| 2008/0177678 | A1 | 7/2008 | Di Martini et al. |
| 2008/0183339 | A1* | 7/2008 | Vaswani et al. ............... 700/297 |
| 2008/0189061 | A1 | 8/2008 | Scholtz et al. |
| 2009/0043520 | A1* | 2/2009 | Pollack et al. ................ 702/62 |
| 2009/0216387 | A1* | 8/2009 | Klein ........................... 700/296 |
| 2010/0094476 | A1* | 4/2010 | Hamilton et al. ............ 700/295 |
| 2010/0152910 | A1 | 6/2010 | Taft |
| 2010/0256830 | A1* | 10/2010 | Kressner et al. ............. 700/291 |
| 2011/0046904 | A1* | 2/2011 | Souilmi ......................... 702/62 |
| 2011/0125335 | A1* | 5/2011 | Boss et al. .................... 700/286 |
| 2011/0145611 | A1* | 6/2011 | Lee ............................... 713/320 |
| 2011/0196547 | A1* | 8/2011 | Park et al. .................... 700/296 |

FOREIGN PATENT DOCUMENTS

| | | |
|---|---|---|
| WO | WO 2009/067251 A1 | 5/2009 |
| WO | WO 2009/135940 A2 | 11/2009 |
| WO | WO 2009/136975 A2 | 11/2009 |

OTHER PUBLICATIONS

Begovic, Miroslav et al., "*Issues Related to the Implementation of Synchrophasor Measurements*," Proceedings of the 41st Hawaii International Conference on System Sciences—2008 IEEE.

Calyam, Prasad, "*Router Architecture and Configuration Basics*," CSE677:Lecture, www.osc.edu/-pcalyam/routerarch_677CSE07.ppt, May 21, 2007.

Annex to Form PCT/ISA/206 Communication Relating to the Results of the Partial International Search issued in PCT/US2009/000888 (3 pgs).

Hojo, Masahide et al., "*Analysis of Load Frequency Control Dynamics Based on Multiple Synchronized Phasor Measurements*," 15th PSCC, Liege Aug. 22-26, 2005.

http://www.geindustrial.com/cwc/Dispatcher?REQUEST=PRODUCTS&PNLID=6&ID=N60, GE Consumer & Industrial Electrical Distribution, "*N60 Network Stability and Synchrophasor Measurement System—Product Information*," Aug. 20, 2008.

http://www.synchrophasors.com/, Schweitzer Engineering Laboratories, Inc., "*Synchophasor Voltage Angle Measurement Real-Time Updates, Synchrophasor-Equipped Devices Report Power System Information From Around the World*," 21 pages (Aug. 20, 2008).

Jiang, Weiqing et al., "*A Distributed State Estimator Utilizing Synchronized Phasor Measurements*," vol. 22, No. 2, May 2007 IEEE.

Larsson, Mats et al., "*Interactive Simulation and Visualization of Wide-Area Monitoring and Control Applications*," retrieved from http://www.dii.unisi.it/hybrid/cc/publications/2004/papers/lar04d.pdf, 6 pages (2005).

Larsson, Mats et al., "*Real-Time Voltage Stability Assessment of Transmission Corridors*," retrieved from http://www.dii.unisi.it/hybrid/cc/publications/2003/iifacpps2003.pdf, 6 pages (2003).

McGraw-Hill, "*Chapter 12: Connecting LANSs and WANs: Make Backbone Networks*", McGraw-Hill Companies, 140.127.22.92/download/learn_web/Tong(92-2)--BDC/.. ./ch-12-n.ppt, 2000.

Overholt, Phil, DOE Update, NSAPI Working Group, 7 pages (Mar. 6, 2008).

Zhao, Liang et al., "*Multiarea State Estimation Using Synchronized Phasor Measurements*," vol. 20, No. 2, May 2005 IEEE.

Zima, Marek et al., "*Design Aspects for Wide Area Monitoring and Control Systems*," vol. 93, No. 5, May 2005 IEEE.

Patent Examination Report No. 1 for corresponding Application No. AU2011284471, issued Mar. 21, 2013, 3 pages.

International Search Report and Written Opinion for corresponding International Application No. PCT/IB2011/001712, 14 pages (Nov. 20, 2012).

International Preliminary Report on Patentability for corresponding International Application No. PCT/IB2011/001712, 10 pages (Feb. 5, 2013).

\* cited by examiner

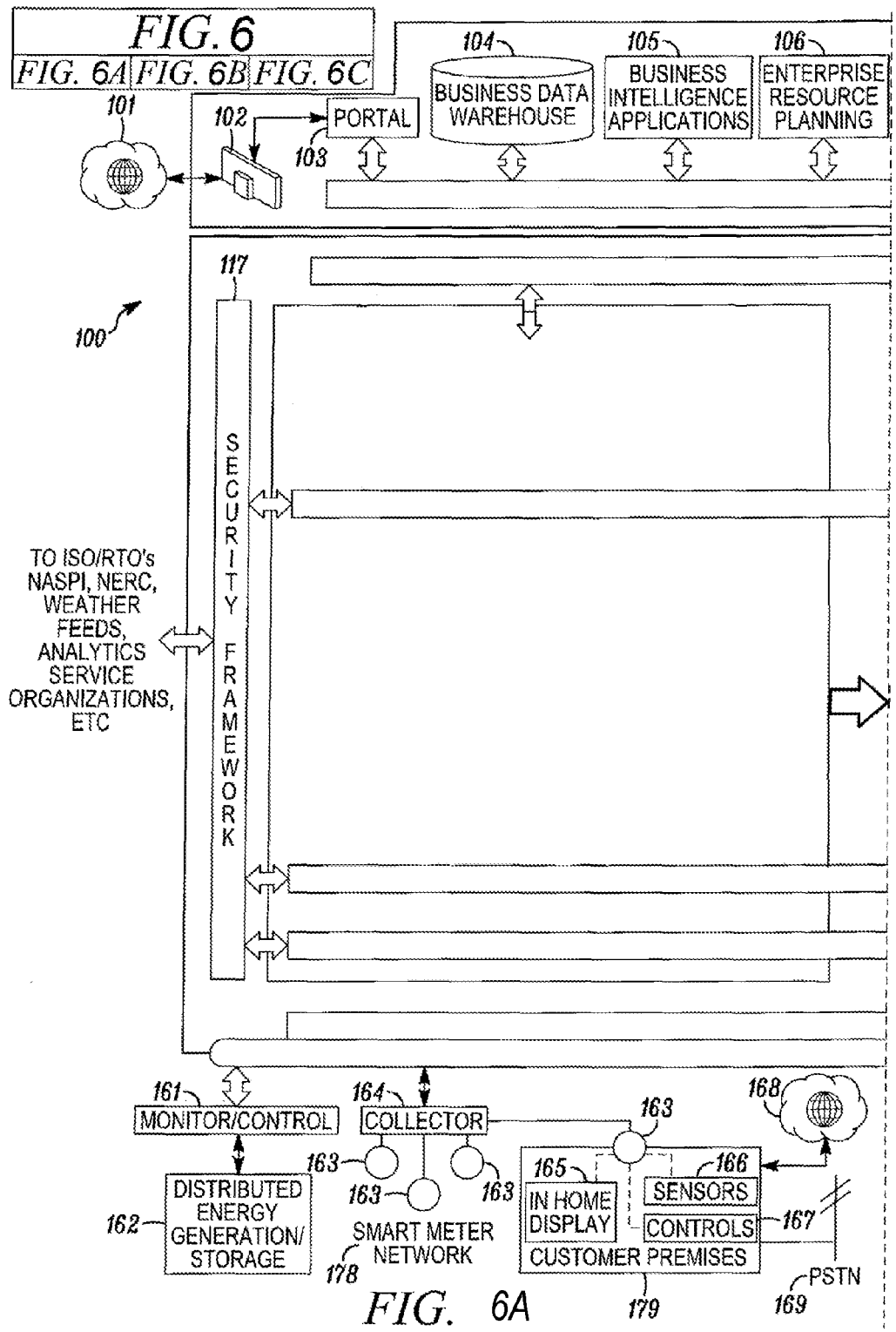

INTELLIGENT CORE ENGINE

REFERENCE TO EARLIER FILED APPLICATION

This application claims the benefit of the filing date of Indian Patent Application Number 2171/CHE/2010, filed 30 Jul. 2010, the disclosure of which is incorporated, in its entirety, by this reference.

BACKGROUND

1. Field of the Invention

The present invention relates generally to a system and method for managing an industry network, and more particularly to a system and method for collecting data from and/or routing data to different sections of a power grid and analyzing the collected/routed data in order to manage the power grid.

2. Related Art

A power grid may include one or all of the following: electricity generation, electric power transmission, and electricity distribution. Electricity may be generated using generating stations, such as a coal fire power plant, a nuclear power plant, etc. For efficiency purposes, the generated electrical power is stepped up to a very high voltage (such as 345K Volts) and transmitted over transmission lines. The transmission lines may transmit the power long distances, such as across state lines or across international boundaries, until it reaches its wholesale customer, which may be a company that owns the local distribution network. The transmission lines may terminate at a transmission substation, which may step down the very high voltage to an intermediate voltage (such as 138K Volts). From a transmission substation, smaller transmission lines (such as sub-transmission lines) transmit the intermediate voltage to distribution substations. At the distribution substations, the intermediate voltage may be again stepped down to a "medium voltage" (such as from 4K Volts to 23K Volts). One or more feeder circuits may emanate from the distribution substations. For example, four to tens of feeder circuits may emanate from the distribution substation. The feeder circuit is a 3-phase circuit comprising 4 wires (three wires for each of the 3 phases and one wire for neutral). Feeder circuits may be routed either above ground (on poles) or underground. The voltage on the feeder circuits may be tapped off periodically using distribution transformers, which step down the voltage from "medium voltage" to the consumer voltage (such as 120V). The consumer voltage may then be used by the consumer.

One or more power companies may manage the power grid, including managing faults, maintenance, and upgrades related to the power grid. However, the management of the power grid is often inefficient and costly. For example, a power company that manages the local distribution network may manage faults that occur in the feeder circuits or on circuits, called lateral circuits, which branch from the feeder circuits. The management of the local distribution network often relies on telephone calls from consumers when an outage occurs or relies on field workers analyzing the local distribution network.

Power companies have attempted to upgrade the power grid using digital technology, sometimes called a "smart grid." For example, more intelligent meters (sometimes called "smart meters") are a type of advanced meter that identifies consumption in more detail than a conventional meter. The smart meter may then communicate that information via some network back to the local utility for monitoring and billing purposes (telemetering).

Even with these advances in the power grid, the analytics and communications for the power grid are complex. A power company may have multiple systems, such as an energy management system (which may analyze load-sharing, and issue commands accordingly), outage management system (which may analyze outages, and issue commands accordingly), demand response system, billing system, etc. These multiple systems may interact with one another, complicating the management of the power grid. Further, these multiple systems may act as multiple sources that issue commands to various targets within the power grid. The multiple systems often communicate in different formats, complicating the communication. Therefore, a need exists to better manage the analytics and communication of the multiple systems within the power grid.

BRIEF SUMMARY

A central management authority for a system, such as a power utility system, is disclosed. The central management authority communicates with a plurality of meter data management systems and with a plurality of headend systems, the meter data management systems generating commands and the headend systems communicating with one or more meters (such as one or more smart meters). One example of an architecture that includes the central management authority and that may manage a smart grid is the Intelligent Network Data Enterprise (hereinafter, termed INDE) Reference Architecture.

The central management authority includes a gateway layer and a core layer. The gateway layer comprises a plurality of input connector routines and a plurality of output connector routines. The plurality of input connector routines comprise at least one separate input connector routine for communicating with each of the plurality of source systems that send data to the central management authority (such as meter data management systems that send connect/disconnect commands from the central management authority). The plurality of output connector routines comprises at least one separate output connector routine for communicating with each of the plurality of target systems that receive data sent from the central management authority (such as the headend systems that receive the connect/disconnect commands from the central management authority).

The core layer of the central management authority comprises a plurality of core adapters, with the core adapters performing a one-to-one translation of communications from the plurality of meter data management systems generating commands to the plurality of the headend systems.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIGS. 6A-C is a block diagram of one example of the overall architecture for a power grid.

DETAILED DESCRIPTION OF THE DRAWINGS AND THE PRESENTLY PREFERRED EMBODIMENTS

By way of overview, the preferred embodiments described below relate to a method and system for managing a power grid. Certain aspects relate to the structural and/or functional capabilities of the central management of the power grid. Intelligent Network Data Enterprise (INDE) is a Smart Grid integration platform, as disclosed in U.S. patent application Ser. No. 12/378,102 (published as U.S. Patent Application No. 2009-0281674A1), in U.S. patent application Ser. No. 12/378,091 (published as U.S. Patent Application No. 2009-0281673A1), and PCT Patent Application No. PCT/US2009/000888 (published as WO 2009/136975), INDE provides highly scalable, configurable application integration solution and has core built-in Smart Grid business processes, such as Advanced Metering Infrastructure, Demand Response, Fault & Outage Intelligence, Substation Analytics, etc., that may be used widely by a utility company.

The INDE Architecture is split into Core and Gateway layers, with the INDE Core providing certain services, such as intelligent service routing, synchronous and asynchronous service call outs, data transformation, and auditing capabilities, and with the INDE Gateway providing application connector services, which may be built with widely used industry communication protocols. For example, the INDE Gateway may include a plurality of input connector routines and a plurality of output connector routines, the plurality of input connector routines including separate input connector routine for communicating with each of the plurality of Meter Data Management (MDM) Systems, and the plurality of output connector routines including separate output connector routines for communicating with each of the plurality of HeadEnd Systems.

Figure 1:
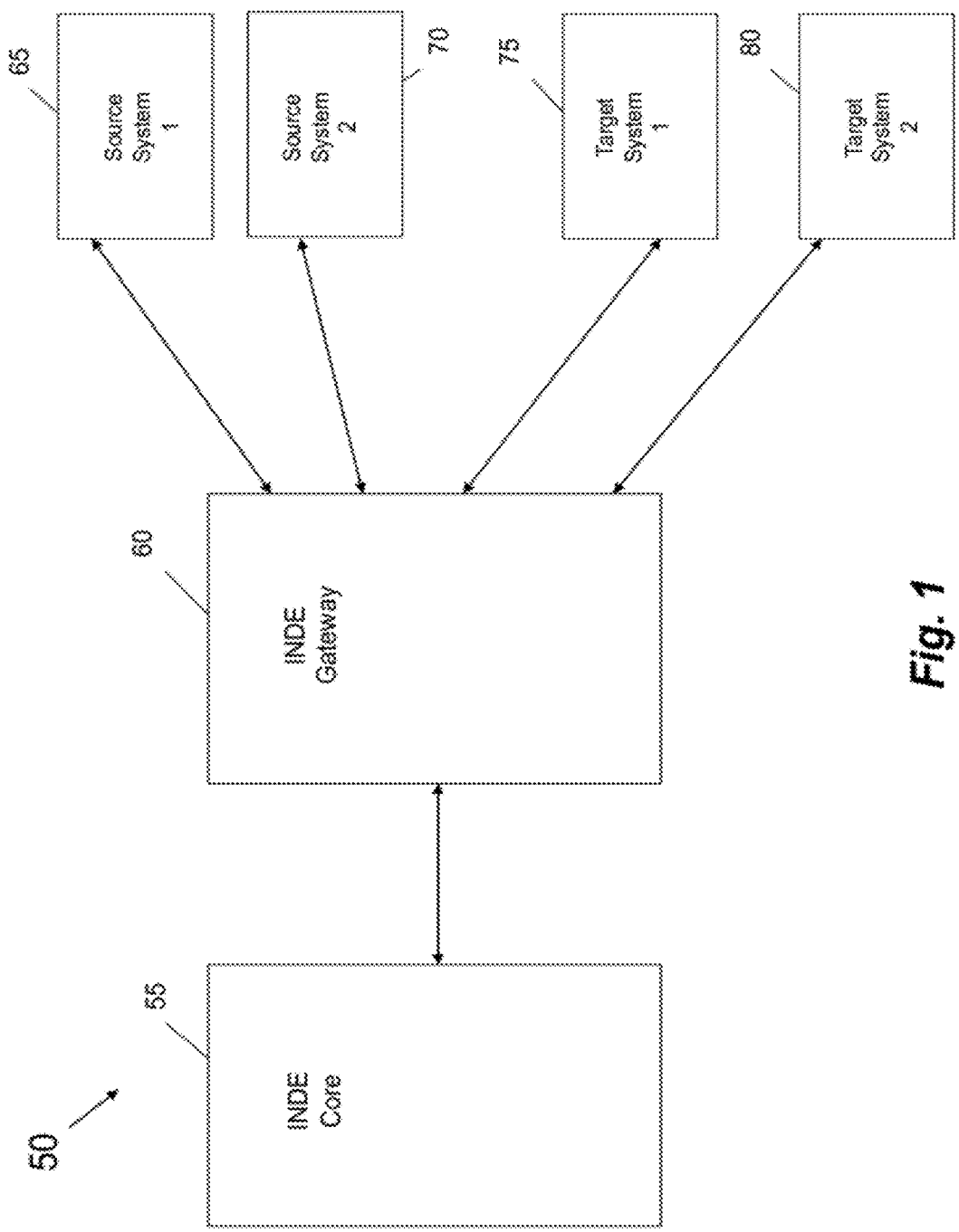
FIG. 1 illustrated an example of a high level INDE Architecture.

The separation of the INDE Core and INDE Gateway provides several benefits, including without limitation, better adaption of the INDE Architecture to known and unknown systems, better scalability, and better security. An example of the high-level architecture 50 is disclosed in FIG. 1. As shown in FIG. 1, the INDE Core 50 is separate from the INDE Gateway 60. Further, the INDE Gateway 60 provides the interface between the INDE Core 50, and the Source Systems (such as Source System 1 (65) and Source System 2 (70)) and Target Systems (such as Target System 1 (75) and Target System 2 (80)). FIG. 1 illustrates two Source Systems and two Target Systems. However, fewer or greater Source Systems and Target Systems are contemplated. As discussed in more detail below, the INDE Gateway includes the connector layer that connects the various source and target systems.

The source system sends a request for information or a command for action, and the target system responds to the request for information or acts on the command. One example of a command may include a disconnect/reconnect action on a meter, which may be generated by a MDM System. The MDM System may include functionality for one or more of the following: data collection and communication systems (including automated meter reading (AMR) and advanced metering infrastructure (AMI)); and meter data management and related software applications. In a typical utility system, there may be multiple MDM Systems so that one of several different MDM Systems may act as the source system. Examples of commercial MDM Systems include LodeStar and Itron. And, the different MDM Systems may originate from different vendors and follow different formats. In this way, the data within the command may contain similar information (such as ID# for the Smart Meter and the command to connect/disconnect), but in different formats.

For example, the command may be sent based on one of several different network protocols, such as file transfer protocol (FTP), java message service (JMS), and hypertext transfer protocol (HTTP). FTP is a standard network protocol that may be used to copy a file from one host to another over a TCP/IP-based network, such as the Internet. FTP is built on a client-server architecture and utilizes separate control and data connections between the client and server applications, which solves the problem of different end host configurations (i.e., Operating Systems, file names). FTP is used with user-based password authentication or with anonymous user access. The JMS API is a Java Message Oriented Middleware (MOM) API for sending messages between two or more clients. JMS is a part of the Java Platform, Enterprise Edition, and is defined by a specification developed under the Java Community Process as JSR 914. It is a messaging standard that allows application components based on the Java 2 Platform, Enterprise Edition (J2EE) to create, send, receive, and read messages. It allows the communication between different components of a distributed application to be loosely coupled, reliable, and asynchronous. Finally, HTTP is an Application Layer protocol for distributed, collaborative, hypermedia information systems.

The command (sent via any one of the different network protocols) may be routed to a HeadEnd System, which transmits the disconnect/reconnect action to a meter installed in a home area network (HAN). Again, in the typical utility system, there may be multiple HeadEnd Systems, such as Secure or Current, so that one of several different HeadEnd Systems may act as the target system.

Different HeadEnd Systems may communicate with different categories of meters. For example, meters may be categorized based on the following: industrial meter, domestic meter, residential meter, vehicle related meter, etc. The different categories of meters may be handled by different HeadEnd Systems (such as an Industrial HeadEnd System, a Residential HeadEnd System, and a Vehicle HeadEnd System). The command is sent to the respective HeadEnd System, which in turn sends the connect/disconnect command to the Smart Meter.

The various HeadEnd Systems may vary in several respects, including differing formats, differing types of loads managed (e.g., high-density HeadEnd System versus a low-density HeadEnd System). As discussed in more detail below, the multiple output connects may account for the different HeadEnd Systems used.

Figure 6B:
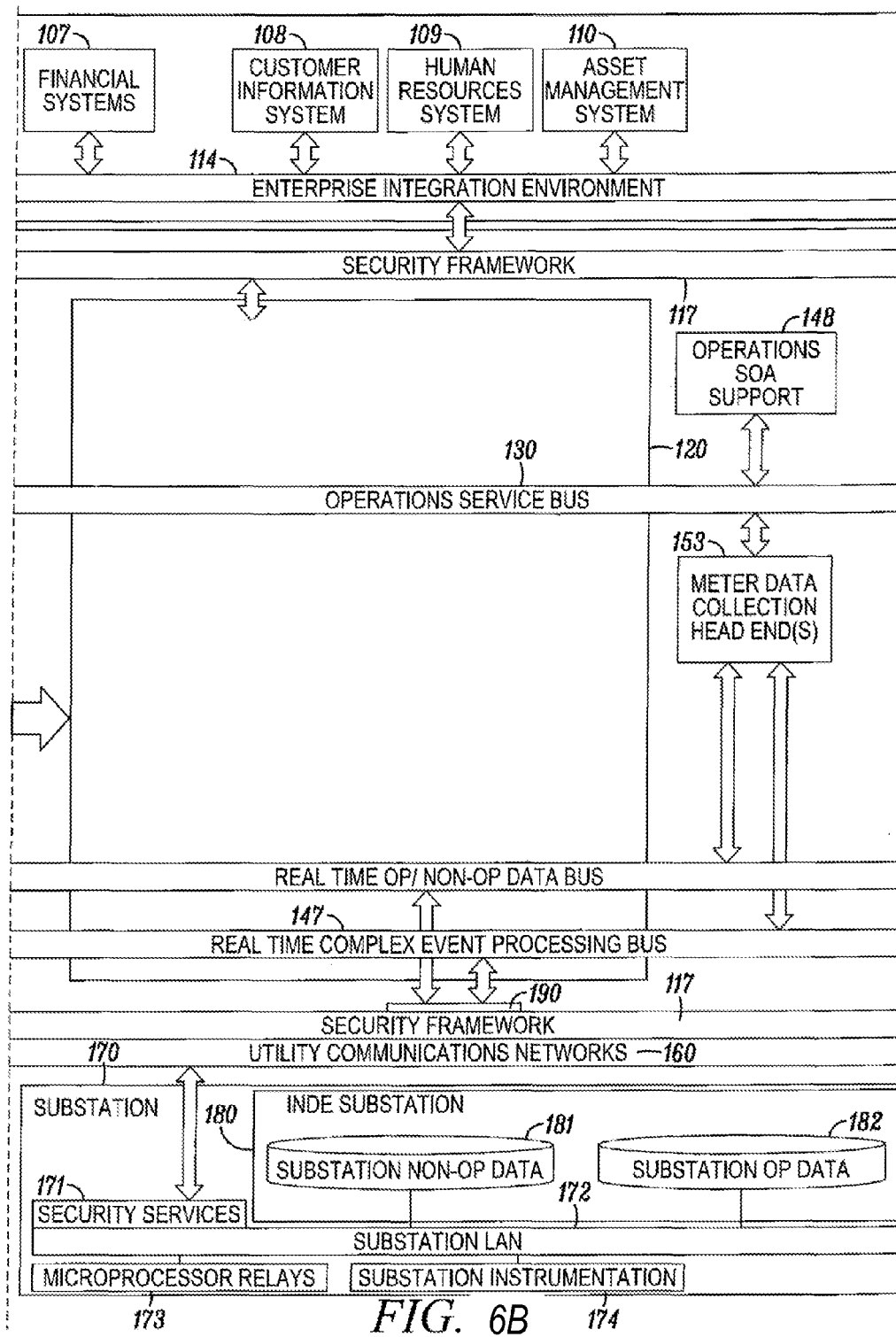
Figure 6C:
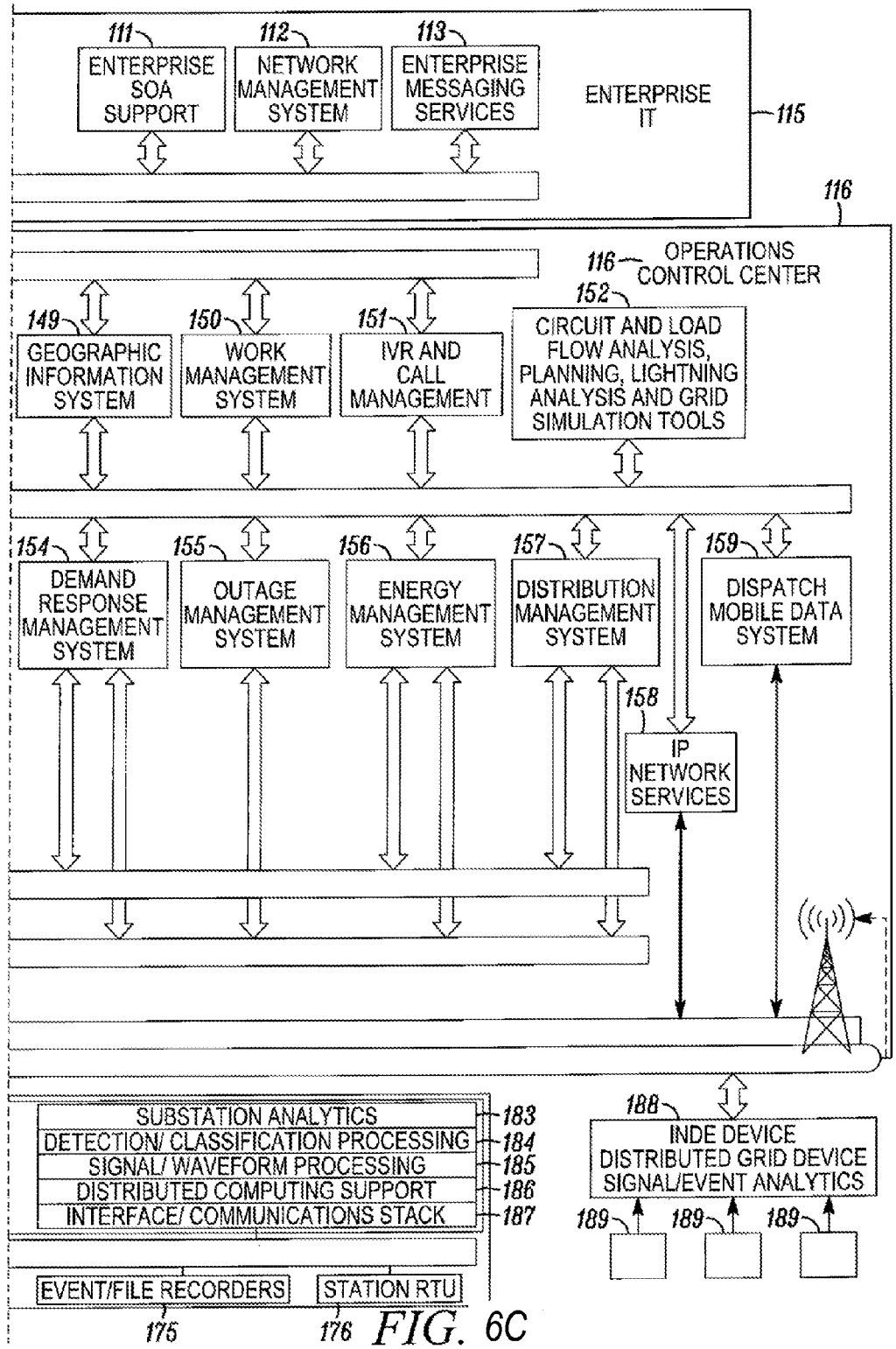

The meter command may be published onto a bus, such as one of the buses disclosed in FIGS. 6A-C. For example, there may be one "publisher" and multiple subscribers to the command. As another example, there may be multiple publishers and multiple subscribers. Based on the present design, there is no limitation as to the specific technology. And, the present design enables tailoring to any publisher or subscriber. As discussed with respect to FIG. 3, there is no need for the publisher and the subscribers to know of a "common format". Instead, the INDE Gateway may tailor the communication to each publisher/subscriber combination, obviating the need for at least some type of common format.

Further, the publisher-subscriber model as presently disclosed may function in a variety of ways. For example, the publisher-subscriber model may operate as a "push," wherein the publisher "pushes" the data (such as a command) and the subscriber "pulls" the data. As another example, the publisher-subscriber model enables "push" and "pull" for both the publisher and the subscriber. In particular, the one or more connectors in the INDE Gateway may be configured to "pull" the data and/or "push" the data. For example, a GMS connector (or an FTP connector) may be configured to "pull" the data from the source system. Or, one of the connectors in the INDE Gateway may be configured as a web-service so that the source system may invoke the web-service and push the data. Further, both the input connector and the output connector may support both the push and the pull methodology simultaneously.

Another example of a command may comprise an On-Demand Meter Read. A MDM System, such as LodeStar, Itron, may send a request for meter information to one of several different HeadEnd Systems, such as Secure or Current.

The source system may also send information to a target system. One example of this is a Periodic Meter Read. A HeadEnd System, such as Secure or Current, may send meter data to one of several MDM Systems.

In this way, the present design may overcome the multiple source systems and the multiple target systems that complicate the formatting and routing of the command. The INDE Gateway, both in terms of its separation from the INDE Core and its design, enables the complicated routing/formatting and allow for the tailoring to different source or target systems. For MDM Systems that act as source systems and HeadEnd Systems that act as target systems, the INDE Gateway may tailor the connectors (such as the input connectors that communicate with each of the plurality of source systems and the output connectors that communicate with each of the plurality of target systems). So that, the INDE Gateway can include multiple input connectors for each of the plurality of MDM Systems and can include multiple output connectors for each of the plurality of HeadEnd Systems, as discussed in more detail in FIGS. 3 and 5. For HeadEnd Systems that act as source systems and MDM Systems that act as target systems, the INDE Gateway may tailor the connectors (such as the input connectors that communicate with each of the plurality of source systems and the output connectors that communicate with each of the plurality of target systems). So that, the INDE Gateway can include multiple input connectors for each of the plurality of HeadEnd Systems and can include multiple output connectors for each of the plurality of MDM Systems, as discussed in more detail in FIG. 4. And, for a system in which a part of the time the MDM System acts as a source system and a part of the time acts as a target system, and in which a part of the time the HeadEnd System acts as a source system and a part of the time acts as a target system, the INDE Gateway can include both types of connectors disclosed in FIGS. 3 and 5, and disclosed in FIG. 4. More specifically, the INDE Gateway can include multiple input connectors and multiple output connectors for each of the plurality of MDM Systems, and can include multiple input connectors and multiple output connectors for each of the plurality of HeadEnd Systems.

The INDE Core may likewise tailor its operations, such as tailor its core adapters, as discussed in more detail below. For example, for MDM Systems that act as source systems and HeadEnd Systems that act as target systems, the INDE Core may include core adapters that translate from each of the MDM Systems to each of the HeadEnd Systems. By way of example, in a system with a first MDM System and a second MDM System, and a first HeadEnd System and a second HeadEnd System, there may be four core adapters to perform the one-to-one translation. In particular, there may be the following core adapters: translation from the first MDM System to the first HeadEnd System; translation from the first MDM System to the second HeadEnd System; translation from the second MDM System to the first HeadEnd System; and translation from the second MDM System to the second HeadEnd System.

As another example, for HeadEnd Systems that act as source systems and MDM Systems that act as target systems, the INDE Core may include core adapters that translate from each of the HeadEnd Systems to each of the MDM Systems. For example, in a system with a first HeadEnd System and a second HeadEnd System, and a first MDM System and a second MDM System, there may be four core adapters to perform the one-to-one translation. In particular, there may be the following core adapters: translation from the first HeadEnd System to the first MDM System; translation from the first HeadEnd System to the second MDM System; translation from the second HeadEnd System to the first MDM System; and translation from the second HeadEnd System to the second MDM System.

Figure 3:
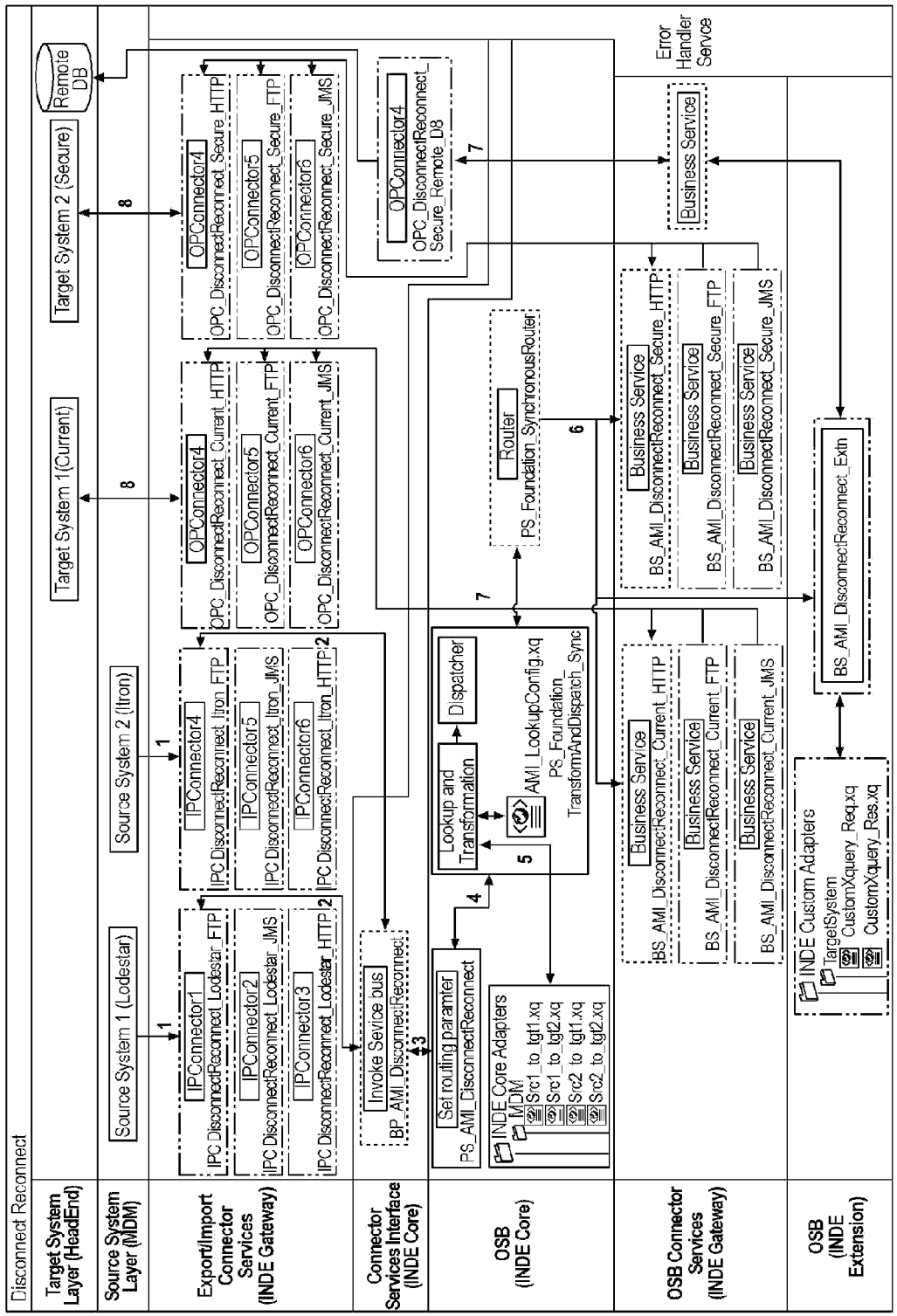
FIG. 3 is an example of a detailed flow diagram for Disconnect or Reconnect Request.
Figure 4:
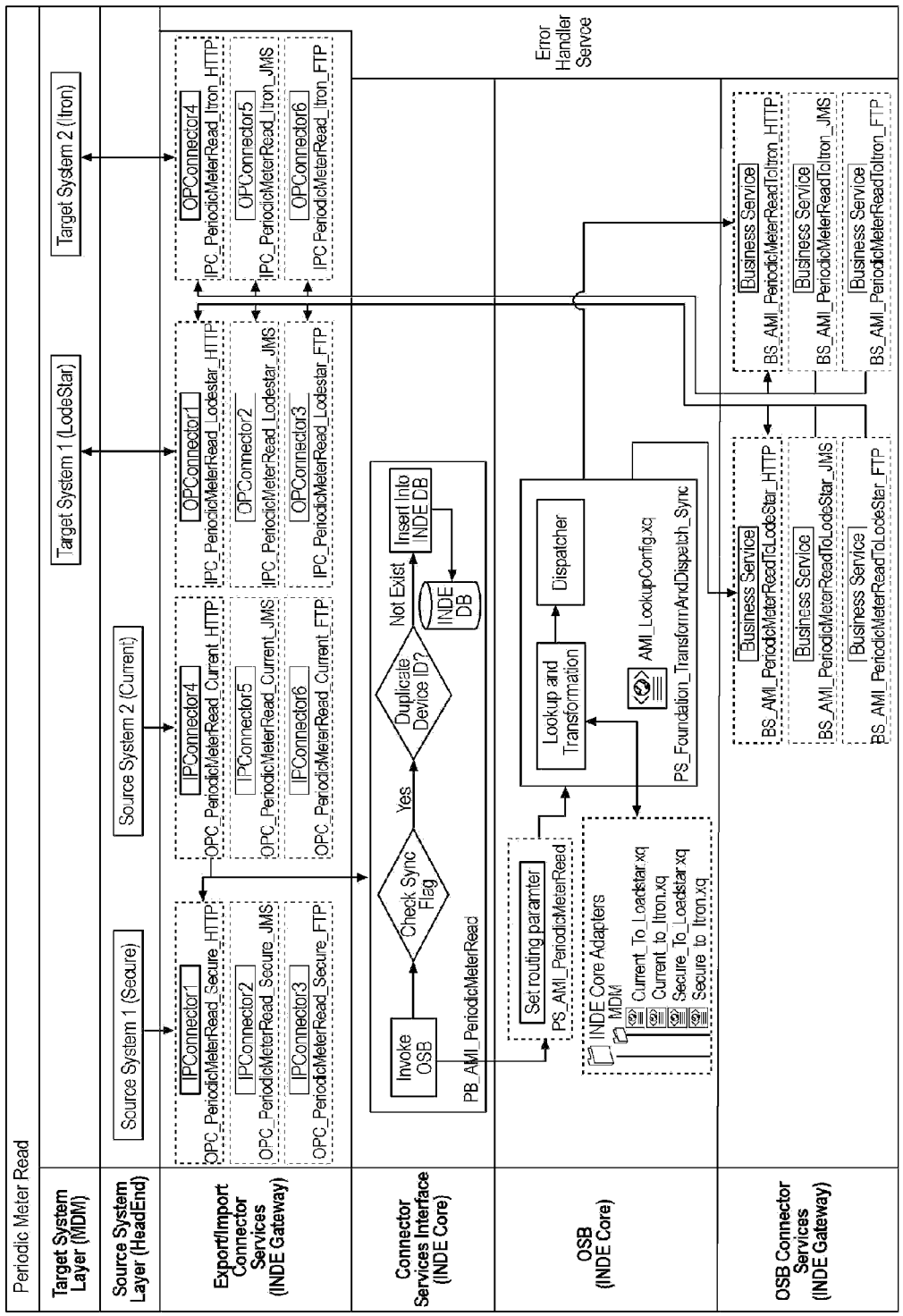
FIG. 4 is an example of a detailed flow diagram for Periodic Meter Read.
Figure 5:
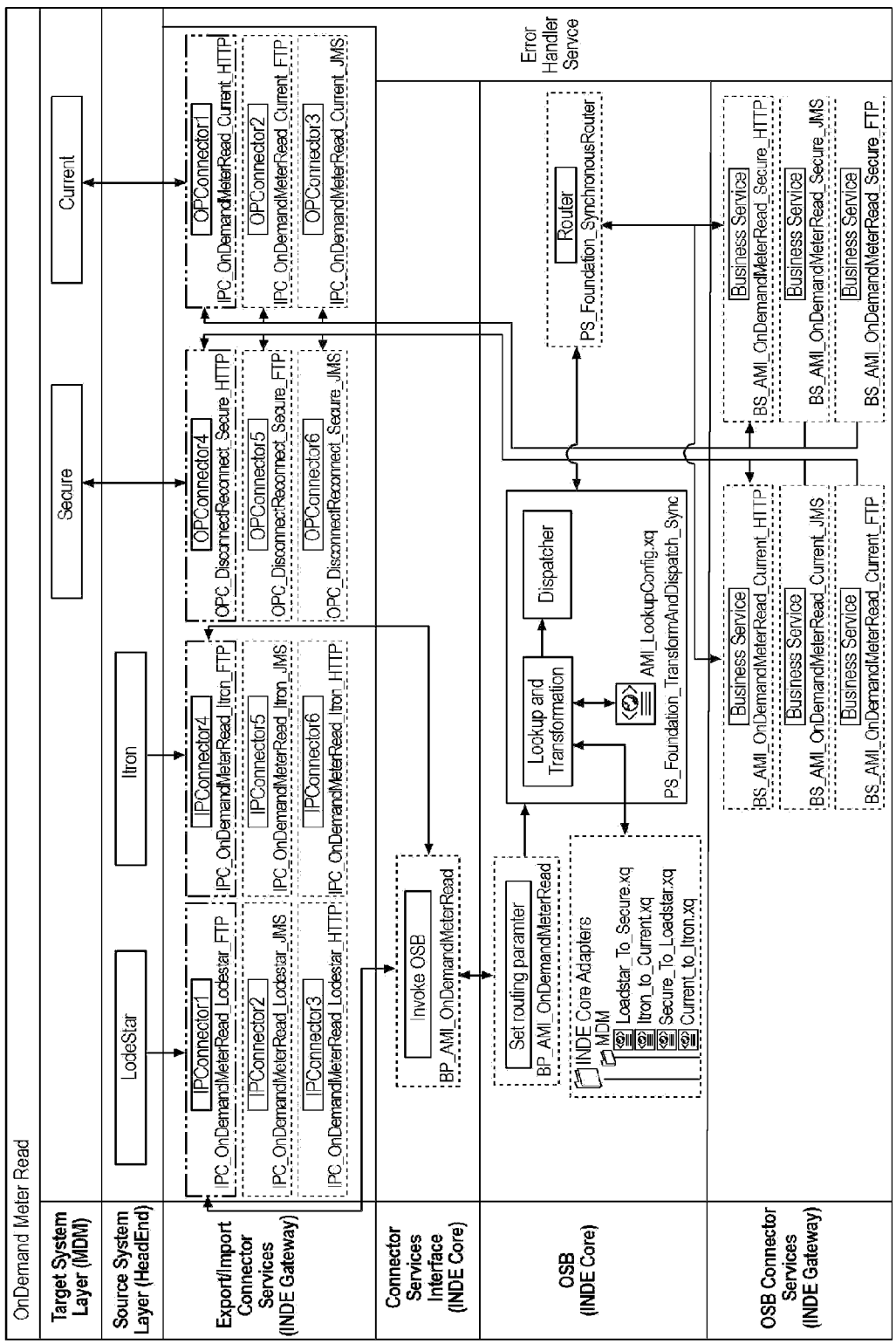
FIG. 5 is an example of a detailed flow diagram for an OnDemand Meter Read Request.

And, for a system in which a part of the time the MDM System acts as a source system and a part of the time acts as a target system, and in which a part of the time the HeadEnd System acts as a source system and a part of the time acts as a target system, the INDE Core can include both types of adapters disclosed in FIGS. 3 and 5, and disclosed in FIG. 4. More specifically, the INDE Core can both a one-to-one translation from each of the plurality of MDM Systems to each of the plurality of HeadEnd Systems, and one-to-one translation from each of the plurality of HeadEnd Systems to each of the plurality of MDM Systems.

Figure 2:
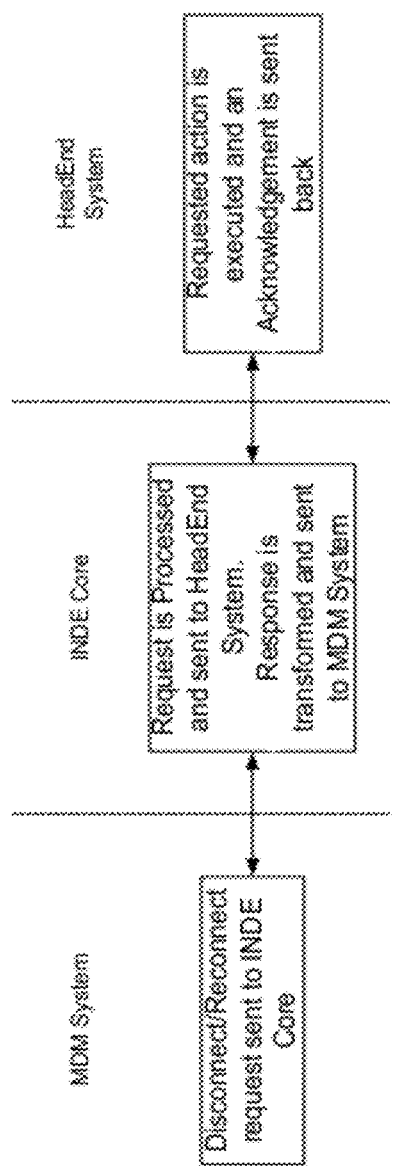
FIG. 2 illustrates a high level flow diagram between the MDM System, INDE Core, and HeadEnd Systems.

Referring to FIG. 2, there is shown a high level flow diagram related to a disconnect or reconnect request. The MDM System sends a disconnect or reconnect request to the INDE Core. The INDE Core receives the request, transforms the request, and forwards the transformed request to one of the HeadEnd Systems, as discussed in more detail below. The HeadEnd System receives the transformed request, executes the requested action, and sends an acknowledgement to the INDE Core. The INDE Core, in turn, receives the acknowledgement, transforms the acknowledgement, and forwards the transformed acknowledgement to the MDM System.

Referring to FIG. 3, there is shown a detailed flow diagram for the 7 layers related to a disconnect or reconnect request. For the disconnect/reconnect request, the source system is the MDM System. As discussed above, commercial examples of the MDM Systems include, but are not limited to, LodeStar and Itron. Likewise, for the disconnect/reconnect request, the target system is the HeadEnd System. As discussed above, the utility system may have one of several types of HeadEnd Systems, such as Secure and Current.

The Export/Import Connector Services layer includes the connectors that connect to the one or more source systems and one or more target systems. These connectors may be created using any type of executable language for specifying interactions with Web Services (such as Business Process Execution Language (BPEL)).

As shown in FIG. 3, the Export/Import Connector Services layer has Input Connectors (such as IPConnector1 to IPConnector6) and Output Connectors (such as OPConnector1 to OPConnector6) for source and target systems respectively. IPC_DisconnectReconnect_LodeStar_FTP (illustrated in IPConnector1) may be used to take the request from a Lode- Star system's FTP location and send it to Connector Services Interface (INDE Core). IPC_DisconnectReconnect_LodeStar_HTTP (illustrated in IPConnector3) may be used to take the request on HTTP protocol from a LodeStar system and send Connector Services Interface (INDE Core). IPC_DisconnectReconnect_LodeStar_JMS (illustrated in IPConnector2) may be used to take the request from LodeStar system's JMS queue and sends it to Connector Services Interface (INDE Core). Similarly, IPC_DisconnectReconnect_Itron_FTP (illustrated in IPConnector4) may be used to take the request from an Itron system's FTP location and send it to Connector Services Interface (INDE Core). IPC_DisconnectReconnect_Itron_HTTP (illustrated in IPConnector6) may be used to take the request on HTTP protocol from an Itron system and send it to Connector Services Interface (INDE Core). IPC_DisconnectReconnect_Itron_JMS (illustrated in IPConnector5) may be used to take the request from Itron system's JMS queue and sends it to Connector Services Interface (INDE Core).

OPC_DisconnectReconnect_Secure_FTP (illustrated in OPConnector2) receives the Disconnect/Reconnect request data from OSB Connector Service and sends it to Secure System at a configured FTP location. OPC_DisconnectReconnect_Secure_HTTP (illustrated in OPConnector1) receives the Disconnect/Reconnect request from OSB Connector Service and sends it to Secure System over HTTP. OPC_DisconnectReconnect_Secure_JMS (illustrated in OPConnector3) receives the Disconnect/Reconnect request from OSB Connector Service and sends it to Secure System in a JMS queue. Likewise, OPC_DisconnectReconnect_Current_FTP (illustrated in OPConnector5) receives the Disconnect/Reconnect request data from OSB Connector Service and sends it to Current System at a configured FTP location. OPC_DisconnectReconnect_Current_HTTP (illustrated in OPConnector4) receives the Disconnect/Reconnect request from OSB Connector Service and sends it to Current System over HTTP. OPC_DisconnectReconnect_Current_JMS (illustrated in OPConnector6) receives the Disconnect/Reconnect request from OSB Connector Service and sends it to Current System in a JMS queue.

As shown in FIG. 3, for each end system (including both source and target systems), the Export/Import Connector Services layer may provide multiple types of connectors. For example, FIG. 3 illustrates that the Export/Import Connector Services layer includes three different connectors supporting three different protocols, namely HTTP, FTP and JMS. In this interface, the MDM system may sends the file via one of several different protocols. In the example depicted in FIG. 3, the MDM system sends the file via the FTP protocol. Hence the other two connectors are shown faded. And, in the example depicted in FIG. 3, the target system (Target System 1 (Current)) expects the data in HTTP format. Hence, OPConnector4 using Http is highlighted, and the other connectors are shown faded. These connectors are capable for checking the data structure of the input data received. On error, it invokes the error handler service. Since the functionality of the Export/Import Connector Services layer resides in the INDE Gateway and is separated from the INDE Core, the Export/Import Connector Services layer may be configured or tailored in one of several ways, depending on client requirements.

The Connector Services Interface (INDE Core) layer comprises the core component that invokes the OSB service. On error, it invokes the error handling service. Due to the design (with the separation of the INDE Core components from the INDE Gateway), the Connector Services Interface (INDE Core) layer need not be modified based on client requirement.

The OSB (INDE Core) layer refers to the lookup.config file to decide the appropriate transformation based on the end systems. After transformation, the OSB INDE Core layer sends the data to the Dispatcher. The Dispatcher asynchronously dispatches the data to be sent to the target systems. On error, it invokes the error handler service.

The OSB (INDE Core) layer comprises the OSB core components that contains the proxy service to perform the transformation of data based on the message format of the target system. PS_AMI_DisconnectReconnect may comprise a proxy service that accepts the input from Connector Services interface (INDE Core) and sets at least one routing parameter (such as the routing header of the incoming request to 'Disconnect/Reconnect'. In the case of a request, PS AMI_DisconnectReconnect further passes the routing parameter to PS_Foundation_TransformAndDispatch_Sync. In case of request, PS_AMI_DisconnectReconnect passes the routing parameter to Connector Services interface (INDE Core).

PS_Foundation_TransformAndDispatch_Sync may comprise a proxy Service that receives a request from PS_AMI_ConnectDisconnect and based on the request routing header and AMI_Lookup.config, performs a transformation. The transformation may include, for example, LodeStar to HeadEnd, HeadEnd to Itron etc. The transformed data may be sent to PS_Foundation_SynchronousRouter along with one or more headers, such as two headers viz. 'routingservice' and 'invokingoperation' for dynamic routing activity in the Router of PS_Foundation_SynchronousRouter.

PS_Foundation_SynchronousRouter retrieves the 'routingservice' name and the 'invokingoperation' name from the user headers set in PS_Foundation_TransformAndDispatch_Sync. PS_Foundation_Synchronous_Router then dynamically routes to the business service as specified in the routingservice header.

The OSB (INDE Core) layer includes one or more INDE Core Adapters. As shown in FIG. 3, the INDE Core Adapters are listed for different source system to different target system transformations. In particular, FIG. 3 illustrates an XQuery transformation from Source System 1 to Target System 1 as Src1_to_tgt1.xq. The specific XQuery transformation is selected based on the AMI_Lookup.config. For example, LodeStar_To_Secure.xq is a transformation from LodeStar Request format to Secure Request format. Secure_To_LodeStar.xq is a transformation from Secure Response format to LodeStar Response format. Itron_To_Secure.xq is a transformation from Itron Request format to Secure Request format. Secure_To_Itron.xq is a transformation from Secure Response format to Itron Response format. LodeStar_To_Current is a transformation from LodeStar Request format to Current Request format. Current_To_LodeStar is a transformation from Current Response format to LodeStar Response format. Itron_To_Current is a transformation from Itron Request format to Current Request format. Current_To_Itron.xq is a transformation from Current Response format to Itron Response format. In addition to the transformations from different source systems to different target systems, custom core adapters may be included for extra transformation apart from INDE Core. For example, CustomXquery_Req.xq may comprise a request Xquery file that does one to one mapping from input to output and may be developed for the INDE Extension layer. CustomXquery_Res.xq may comprise a response Xquery file that does one to one mapping from input to output and may be developed for the INDE Extension layer.

The OSB Connector Services (INDE Gateway) layer comprises the OSB Business Services. This layer receives data from the Dispatcher and sends it to the Output Connectors (such as OPConnector1 to OPConnector6). As depicted in FIG. 3, there is one business service per output connector. For example, the OSB Connector Services (INDE Gateway) includes BS_AMI_DisconnectReconnect_Secure_FTP, which may comprise a business service that receives a call from Dispatcher (depending on the message header) and invokes OPC_DisconnectReconnect_Secure_FTP (depicted in Export/Import Connector Services (INDE Gateway)). BS_AMI_DisconnectReconnect_Secure_HTTP may comprise a business service that receives a call from Dispatcher (depending on the message header) and invokes OPC_DisconnectReconnect_Secure_HTTP (depicted in Export/Import Connector Services (INDE Gateway)). BS_AMI_DisconnectReconnect_Secure_JMS is a business service that receives a call from Dispatcher (depending on the message header) and invokes OPC_DisconnectReconnect_Secure_JMS (depicted in Export/Import Connector Services (INDE Gateway)). BS_AMI_DisconnectReconnect_Current_FTP is a business service that receives a call from Dispatcher (depending on the message header) and invokes OPC_DisconnectReconnect_Current_FTP (depicted in Export/Import Connector Services (INDE Gateway)). BS_AMI_DisconnectReconnect_Current_HTTP is a business service that receives a call from Dispatcher (depending on the message header) and invokes OPC_DisconnectReconnect_Current_HTTP (depicted in Export/Import Connector Services (INDE Gateway)). BS_AMI_DisconnectReconnect_Current_JMS is a business service that receives a call from Dispatcher (depending on the message header) and invokes OPC_DisconnectReconnect_Current_JMS (depicted in Export/Import Connector Services (INDE Gateway)). Finally, BS_AMI_DisconnectReconnect_Extn may call may call an output connector (such as OPConnector 4) for Remote Database (DB), which may be the extension layer database.

The OSB (INDE Extension) Layer provides custom transformation to end systems with unknown message formats. This capability may connect to a remote database, as illustrated in FIG. 3. PS_AMI_DisconnectReconnect_Extn may comprise a proxy service from the OSB (INDE Extension) Layer. PS_AMI_DisconnectReconnect_Extn may apply multiple queries, such as two custom Xqueries, which is designed to query collections of XML data. The two custom Xqueries may be for request and for response. For example, by applying the request Xquery, PS_AMI_DisconnectReconnect_Extn may send the transformed request to the business service of the extension layer, e.g., BS_AMI_DisconnectReconnect_Extn.

The error handler service may comprise a separate process that may be invoked by other processes in the different layers to handle various exceptions.

FIG. 3 illustrates an example of the flow. At step 1, the Export/Import Connector services (INDE Gateway) receives the disconnect or reconnect request from a MDM system, such as Source System 1 or Source System 2, through FTP protocol. At step 2, the request is forwarded by IPConnector to Connector Services Interface (INDE Core). At step 3, Connector Services Interface (INDE Core) invokes OSB (INDE Core). At step 4, OSB (INDE Core) performs a lookup. At step 5, OSB (INDE Core) transforms, using INDE Core Adapters, according to target HeadEnd system. At step 6, OSB (INDE Core) dispatches it to OSB Connector Services (INDE Gateway). At step 7, OSB Connector Services send the transmission to Export/Import Connector services (INDE Gateway). At step 8, Export/Import Connector services (INDE Gateway) sends it to a HeadEnd System, such as Secure or Current, to execute the action (such as disconnect or reconnect). After successful disconnect/reconnect, a response is send in the reverse way (step 7 through step 1) to MDM system through all the above mentioned processes.

FIG. 4 illustrates a detailed flow diagram related to a periodic meter read. In this instance, the source system comprises one of the HeadEnd systems, such as Current or Secure, and the target system comprises one of the MDM systems, such as LodeStar or Itron.

Similar to FIG. 3, the Export/Import Connector Services (INDE Gateway) layer includes different routines on the input side for the different types of source systems and different formats, such as IPC_PeriodicMeterRead_Secure_Http, IPC_PeriodicMeterRead_Secure_JMS, IPC_PeriodicMeterRead_Secure_FTP, IPC_PeriodicMeterRead_Current_Http, IPC_PeriodicMeterRead_Current_JMS, and IPC_PeriodicMeterRead_Current_FTP. Further, the Export/Import Connector Services (INDE Gateway) layer includes different routines on the output side for the different types of target systems and different formats, such as OPC_PeriodicMeterRead_LodeStar_Http, OPC_PeriodicMeterRead_LodeStar_JMS, OPC_PeriodicMeterRead_LodeStar_FTP, OPC_PeriodicMeterRead_Itron_Http, OPC_PeriodicMeterRead_Itron_JMS, and OPC_PeriodicMeterRead_Itron_FTP.

The Connective Services Interface (INDE Core) layer receives input from the Export/Import Connector Services (INDE Gateway) layer and invokes the OSB (INDE Core). Specifically, BP_AMI_PeriodicMeterRead invokes the OSB, checks whether there is a sync flag. If so, it is determined whether there is a duplicate Device ID. If it does not exist, the INDE Database (DB) is updated by inserting the Device ID into the INDE DB.

The OSB (INDE Core) layer and the OSB Connector Services (INDE Gateway) in FIG. 4 operate similarly to the OSB (INDE Core) layer and the OSB Connector Services (INDE Gateway) discussed in FIG. 3.

FIG. 5 illustrates a detailed flow diagram related to an On Demand meter read. In this instance, the source system comprises one of the MDM systems, such as LodeStar or Itron and the target system comprises one of the HeadEnd systems, such as Current or Secure.

FIGS. 6A-C is a block diagram of one example of the overall architecture for a power grid. The architecture, including INDE Core 55 in combination with the INDE Gateway 60, enables functionality that may be important to a smart grid, and may include: (1) data collection processes; (2) data categorization and persistence processes; and (3) observability processes. As discussed in more detail below, using these processes allows one to "observe" the grid, analyze the data and derive information about the grid.

The architecture depicted in FIGS. 6A-C are merely for illustration purposes and may serve as a reference model that provides for end to end collection, transport, storage, and management of smart grid data; it may also provide analytics and analytics management, as well as integration of the forgoing into utility processes and systems. Hence, it may be viewed as an enterprise-wide architecture. Certain elements, such as operational management and aspects of the grid itself, are discussed in more detail below.

The architecture depicted in FIGS. 6A-C may include up to four data and integration buses: (1) a high speed sensor data bus 146 (which may include operational and non-operational data); (2) a dedicated event processing bus 147 (which may include event data); (3) an operations service bus 130 (which may serve to provide information about the smart grid to the utility back office applications); and (4) an enterprise service bus for the back office IT systems (shown in FIGS. 6A-C as the enterprise integration environment bus 114 for serving enterprise IT 115). The separate data buses may be achieved in one or more ways. For example, two or more of the data buses, such as the high speed sensor data bus 146 and the event processing bus 147, may be different segments in a single data bus. Specifically, the buses may have a segmented structure or platform. As discussed in more detail below, hardware and/or software, such as one or more switches, may be used to route data on different segments of the data bus.

As another example, two or more of the data buses may be on separate buses, such as separate physical buses in terms of the hardware needed to transport data on the separate buses. Specifically, each of the buses may include cabling separate from each other. Further, some or all of the separate buses may be of the same type. For example, one or more of the buses may comprise a local area network (LAN), such as Ethernet® over unshielded twisted pair cabling and Wi-Fi. As discussed in more detail below, hardware and/or software, such as a router, may be used to route data on data onto one bus among the different physical buses.

As still another example, two or more of the buses may be on different segments in a single bus structure and one or more buses may be on separate physical buses. Specifically, the high speed sensor data bus 146 and the event processing bus 147 may be different segments in a single data bus, while the enterprise integration environment bus 114 may be on a physically separate bus.

Though FIGS. 6A-C depict four buses, fewer or greater numbers of buses may be used to carry the four listed types of data. For example, a single unsegmented bus may be used to communicate the sensor data and the event processing data (bringing the total number of buses to three), as discussed below. And, the system may operate without the operations service bus 130 and/or the enterprise integration environment bus 114.

The IT environment may be SOA-compatible. Service Oriented Architecture (SOA) is a computer systems architectural style for creating and using business processes, packaged as services, throughout their lifecycle. SOA also defines and provisions the IT infrastructure to allow different applications to exchange data and participate in business processes. Although, the use of SOA and the enterprise service bus are optional.

The figures illustrate different elements within the overall architecture, such as the following: (1) INDE Core 55; (2) INDE Substation 180; and (3) INDE Device 188. This division of the elements within the overall architecture is for illustration purposes. Other division of the elements may be used. The INDE architecture may be used to support both distributed and centralized approaches to grid intelligence, and to provide mechanisms for dealing with scale in large implementations.

The INDE Reference Architecture is one example of the technical architecture that may be implemented. For example, it may be an example of a meta-architecture, used to provide a starting point for developing any number of specific technical architectures, one for each utility solution, as discussed below. Thus, the specific solution for a particular utility may include one, some, or all of the elements in the INDE Reference Architecture. And, the INDE Reference Architecture may provide a standardized starting point for solution development. Discussed below is the methodology for determining the specific technical architecture for a particular power grid.

The INDE Reference Architecture may be an enterprise wide architecture. Its purpose may be to provide the framework for end to end management of grid data and analytics and integration of these into utility systems and processes. Since smart grid technology affects every aspect of utility business processes, one should be mindful of the effects not just at the grid, operations, and customer premise levels, but also at the back office and enterprise levels. Consequently the INDE Reference Architecture can and does reference enterprise level SOA, for example, in order to support the SOA environment for interface purposes. This should not be taken as a requirement that a utility must convert their existing IT environment to SOA before a smart grid can be built and used. An enterprise service bus is a useful mechanism for facilitating IT integration, but it is not required in order to implement the rest of the smart grid solution. The discussion below focuses on different components of the INDE smart grid elements.

INDE Component Groups

As discussed above, the different components in the INDE Reference Architecture may include, for example: (1) INDE Core 55; (2) INDE Substation 180; and (3) INDE Device 188.

The INDE Core 55 is the portion of INDE Reference Architecture that may reside in an operations control center, as shown in FIGS. 6A-C. The INDE Core 55 may contain a unified data architecture for storage of grid data and an integration schema for analytics to operate on that data. This data architecture may use the International Electrotechnical Commission (IEC) Common Information Model (CIM) as its top level schema. The IEC CIM is a standard developed by the electric power industry that has been officially adopted by the IEC, aiming to allow application software to exchange information about the configuration and status of an electrical network.

In addition, this data architecture may make use of federation middleware 134 to connect other types of utility data (such as, for example, meter data, operational and historical data, log and event files), and connectivity and meta-data files into a single data architecture that may have a single entry point for access by high level applications, including enterprise applications. Real time systems may also access key data stores via the high speed data bus and several data stores can receive real time data. Different types of data may be transported within one or more buses in the smart grid. As discussed below in the INDE Substation 180 section, substation data may be collected and stored locally at the substation. Specifically, a database, which may be associated with and proximate to the substation, may store the substation data. Analytics pertaining to the substation level may also be performed at the substation computers and stored at the substation database, and all or part of the data may be transported to the control center.

The types of data transported may include operation and non-operational data, events, grid connectivity data, and network location data. Operational data may include, but is not limited to, switch state, feeder state, capacitor state, section state, meter state, FCI state, line sensor state, voltage, current, real power, reactive power, etc. Non-operational data may include, but is not limited to, power quality, power reliability, asset health, stress data, etc. The operational and non-operational data may be transported using an operational/non-operational data bus 146. Data collection applications in the electric power transmission and/or electricity distribution of the power grid may be responsible for sending some or all of the data to the operational/non-operational data bus 146. In this way, applications that need this information may be able to get the data by subscribing to the information or by invoking services that may make this data available.

Events may include messages and/or alarms originating from the various devices and sensors that are part of the smart grid, as discussed below. Events may be directly generated from the devices and sensors on the smart grid network as well as generated by the various analytics applications based on the measurement data from these sensors and devices. Examples of events may include meter outage, meter alarm, transformer outage, etc. Grid components like grid devices (smart power sensors (such as a sensor with an embedded processor that can be programmed for digital processing capability) temperature sensors, etc.), power system components that includes additional embedded processing (RTUs, etc), smart meter networks (meter health, meter readings, etc), and mobile field force devices (outage events, work order completions, etc) may generate event data, operational and non-operational data. The event data generated within the smart grid may be transmitted via an event bus 147.

Grid connectivity data may define the layout of the utility grid. There may be a base layout which defines the physical layout of the grid components (sub stations, segments, feeders, transformers, switches, reclosers, meters, sensors, utility poles, etc) and their interconnectivity at installation. Based on the events within the grid (component failures, maintenance activity, etc), the grid connectivity may change on a continual basis. As discussed in more detail below, the structure of how the data is stored as well as the combination of the data enable the historical recreation of the grid layout at various past times. Grid connectivity data may be extracted from the Geographic Information System (GIS) on a periodic basis as modifications to the utility grid are made and this information is updated in the GIS application.

Network location data may include the information about the grid component on the communication network. This information may be used to send messages and information to the particular grid component. Network location data may be either entered manually into the Smart Grid database as new Smart Grid components are installed or is extracted from an Asset Management System if this information is maintained externally.

Data may be sent from various components in the grid (such as INDE Substation 180 and/or INDE Device 188). The data may be sent to the INDE Core 55 wirelessly, wired, or a combination of both. The data may be received by utility communications networks 160, which may send the data to routing device 190. Routing device 190 may comprise software and/or hardware for managing routing of data onto a segment of a bus (when the bus comprises a segmented bus structure) or onto a separate bus. Routing device may comprise one or more switches or a router. Routing device 190 may comprise a networking device whose software and hardware routes and/or forwards the data to one or more of the buses. For example, the routing device 190 may route operational and non-operational data to the operational/non-operational data bus 146. The router may also route event data to the event bus 147.

The routing device 190 may determine how to route the data based on one or more methods. For example, the routing device 190 may examine one or more headers in the transmitted data to determine whether to route the data to the segment for the operational/non-operational data bus 146 or to the segment for the event bus 147. Specifically, one or more headers in the data may indicate whether the data is operation/non-operational data (so that the routing device 190 routes the data to the operational/non-operational data bus 146) or whether the data is event data (so that the routing device 190 routes the event bus 147). Alternatively, the routing device 190 may examine the payload of the data to determine the type of data (e.g., the routing device 190 may examine the format of the data to determine if the data is operational/non-operational data or event data).

One of the stores, such as an operational data warehouse (not shown in FIGS. 6A-C) that stores the operational data, may be implemented as true distributed database. Another of the stores, the historian may be implemented as a distributed database. The other "ends" of these two databases may be located in the INDE Substation 180 group. Further, events may be stored directly into any of several data stores via the complex event processing bus. Specifically, the events may be stored in event logs, which may be a repository for all the events that have published to the event bus 147. The event log may store one, some, or all of the following: event id; event type; event source; event priority; and event generation time. The event bus 147 need not store the events long term, providing the persistence for all the events.

The storage of the data may be such that the data may be as close to the source as possible or practicable. In one implementation, this may include, for example, the substation data being stored at the INDE Substation 180. But this data may also be required at the operations control center level 116 to make different types of decisions that consider the grid at a much granular level. In conjunction with a distributed intelligence approach, a distributed data approach may be been adopted to facilitate data availability at all levels of the solution through the use of database links and data services as applicable. In this way, the solution for the historical data store (which may be accessible at the operations control center level 116) may be similar to that of the operational data store. Data may be stored locally at the substation and database links configured on the repository instance at the control center, provide access to the data at the individual substations. Substation analytics may be performed locally at the substation using the local data store. Historical/collective analytics may be performed at the operations control center level 116 by accessing data at the local substation instances using the database links. Alternatively, data may be stored centrally at the INDE Core 55. However, given the amount of data that may need to be transmitted from the INDE Devices 188, the storage of the data at the INDE Devices 188 may be preferred. Specifically, if there are thousands or tens of thousands of substations (which may occur in a power grid), the amount of data that needs to be transmitted to the INDE Core 55 may create a communications bottleneck.

Finally, the INDE Core 55 may program or control one, some or all of the INDE Substation 180 or INDE Device 188 in the power grid. For example, the INDE Core 55 may modify the programming (such as download an updated program) or provide a control command to control any aspect of the INDE Substation 180 or INDE Device 188 (such as control of the sensors or analytics). Other elements in the INDE Core 55 may include various integration elements to support this logical architecture.

Table 1 describes the certain elements of INDE Core 55.

TABLE 1

INDE Core Elements

| INDE Core Element | Description |
|---|---|
| CEP Services | Provides high speed, low latency event stream processing, event filtering, and multi-stream event correlation |
| Centralized Grid Analytics Applications | May consist of any number of commercial or custom analytics applications that are used in a non-real time manner, primarily operating from the data stores in CORE |

TABLE 1-continued

INDE Core Elements

| INDE Core Element | Description |
|---|---|
| Visualization/ Notification Services | Support for visualization of data, states and event streams, and automatic notifications based on event triggers |
| Application Management Services | Services (such as Applications Support Services and Distributed Computing Support) that support application launch and execution, web services, and support for distributed computing and automated remote program download (e.g., OSGi) |
| Network Management Services | Automated monitoring of communications networks, applications and databases; system health monitoring, failure root cause analysis (non-grid) |
| Grid Meta-Data Services | Services (such as Connectivity Services, Name Translation, and TEDS Service) for storage, retrieval, and update of system metadata, including grid and communication/sensor net connectivity, point lists, sensor calibrations, protocols, device set points, etc. |
| Grid Data/ Analytics Services | Services (such as Sensor Data Services and Analytics Management Services) to support access to grid data and grid analytics; management of analytics |
| Meter Data Management (MDM) System | Meter data management system functions (e.g., LodeStar, Itron), discussed above |
| AMOS Meter Data Services | See discussion below |
| Real Time Complex Event Processing Bus 147 | Message bus dedicated to handling event message streams - purpose of a dedicated bus it to provide high bandwidth and low latency for highly bursty event message floods. The event message may be in the form of XML message. Other types of messages may be used. Events may be segregated from operational/non-operational data, and may be transmitted on a separate or dedicated bus. Events typically have higher priority as they usually require some immediate action from a utility operational perspective (messages from defective meters, transformers, etc) The event processing bus (and the associated event correlation processing service depicted in FIGS. 6A-C) may filter floods of events down into an interpretation that may better be acted upon by other devices. In addition, the event processing bus may take multiple event streams, find various patterns occurring across the multiple event streams, and provide an interpretation of multiple event streams. In this way, the event processing bus may not simply examine the event data from a single device, instead looking at multiple device (including multiple classes of devices that may be seemingly unrelated) in order to find correlations. The analysis of the single or multiple event streams may be rule based |
| Real Time Op/Non-Op Data Bus 146 | Operational data may include data reflecting the current state of the electrical state of the grid that may be used in grid control (e.g., currents, voltages, real power, reactive power, etc.). Non-operational data may include data reflecting the "health" or condition of a device. Operational data has previously been transmitted directly to a specific device (thereby creating a potential "silo" problem of not making the data available to other devices or other applications). For example, operational data previously was transmitted to the SCADA (Supervisory Control And Data Acquisition) system for grid management (monitor and control grid). However, using the bus structure, the operational data may also be used for load balancing, asset utilization/optimization, system planning, etc. Non-operational data was previously obtained by sending a person in the field to collect the operational data (rather than automatically sending the non-operational data to a central repository). Typically, the operational and non-operational data are generated in the various devices in the grid at predetermined times. This is in contrast to the event data, which typically is generated in bursts, as discussed below. A message bus may be dedicated to handling streams of operational and non-operational data from substations and grid devices. The purpose of a dedicated bus may be to provide constant low latency through put to match the data flows; as discussed elsewhere, a single bus may be used for transmission of both the operation and non-operational data and the event processing data in some circumstances (effectively combining the operation/non-operational data bus with the event processing bus). |
| Operations Service Bus 130 | Message bus that supports integration of typical utility operations applications (EMS (energy management system), DMS (distribution management system), OMS (outage management system), GIS (geographic information system), dispatch) with newer smart grid functions and systems (DRMS (demand response management system), external analytics, CEP, visualization). The various buses, including the Operation/Non-operational Data bus 146, the Event data bus 147, and the operations Service Bus 130 may obtain weather feeds, etc. via a security framework 117. The operations service bus 130 may serve as the provider of information about the smart grid to the utility back office applications, as shown in FIGS. 6A-C. The analytics applications may turn the raw data from the sensors and devices on the grid into actionable information that will be available to utility applications to perform actions to control the grid. Although most of the interactions between the utility back office applications and the INDE Core 55 is expected to occur thru this bus, utility applications will have access to the other two buses and will consume data from those buses as well (for example, meter readings from the op/non-op data bus 146, outage events from the event bus 147) |
| CIM Data Warehouse | Top level data store for the organization of grid data; uses the IEC CIM data schema; provides the primary contact point for access to grid data from the operational systems and the enterprise systems. Federation Middleware allow communication to the various databases. |
| Connectivity Warehouse | The connectivity warehouse may contain the electrical connectivity information of the components of the grid. This information may be derived from the Geographic Information System (GIS) of the utility which holds the as built geographical location of the components that make up the grid. The data in the connectivity warehouse may describe the hierarchical information about all the components of the grid (substation, feeder, section, segment, branch, t-section, circuit breaker, recloser, switch, etc - basically all the assets). The connectivity warehouse may have the asset and connectivity information as built. Thus, the connectivity warehouse may comprise the asset database that includes all the devices and sensors attached to the components of the grid. |
| Meter Data Warehouse | The meter data warehouse may provide rapid access to meter usage data for analytics. This repository may hold all the meter reading information from the meters at customer premises. The data collected from the meters may be stored in meter data warehouse and provided to other utility applications for billing (or other back-office operations) as well as other analysis. |
| Event Logs | Collection of log files incidental to the operation of various utility systems. The event logs may be used for post mortem analysis of events and for data mining |

TABLE 1-continued

INDE Core Elements

| INDE Core Element | Description |
|---|---|
| Historical Data | Telemetry data archive in the form of a standard data historian. Historical data may hold the time series non-operational data as well as the historical operational data. Analytics pertaining to items like power quality, reliability, asset health, etc may be performed using data in historical data. Additionally, as discussed below, historical data may be used to derive the topology of the grid at any point in time by using the historical operational data in this repository in conjunction with the as-built grid topology stored in the connectivity data mart. Further, the data may be stored as a flat record, as discussed below. |
| Operational Data | Operational Data may comprise a real time grid operational database. Operational Data may be built in true distributed form with elements in the substations (with links in Operational Data) as well as the Operations center. Specifically, the Operational Data may hold data measurements obtained from the sensors and devices attached to the grid components. Historical data measurements are not held in this data store, instead being held in historical data. The data base tables in the Operational Data may be updated with the latest measurements obtained from these sensors and devices. |
| DFR/SER Files | Digital fault recorder and serial event recorder files; used for event analysis and data mining; files generally are created in the substations by utility systems and equipment |

As discussed in Table 1, the real time data bus 146 (which communicates the operation and non-operational data) and the real time complex event processing bus 147 (which communicates the event processing data) may be combined into a single bus 346.

As shown in FIGS. 6A-C, the buses are separate for performance purposes. For CEP processing, low latency may be important for certain applications which are subject to very large message bursts. Most of the grid data flows, on the other hand, are more or less constant, with the exception of digital fault recorder files, but these can usually be retrieved on a controlled basis, whereas event bursts are asynchronous and random.

FIGS. 6A-C further show additional elements in the operations control center 116 separate from the INDE Core 55. Specifically, FIGS. 6A-C further show Meter Data Collection Head End(s) 153, a system that is responsible for communicating with meters (such as collecting data from them and providing the collected data to the utility). Demand Response Management System 154 is a system that communicates with equipment at one or more customer premises that may be controlled by the utility. Outage Management System 155 is a system that assists a utility in managing outages by tracking location of outages, by managing what is being dispatched, and by how they are being fixed. Energy Management System 156 is a transmission system level control system that controls the devices in the substations (for example) on the transmission grid. Distribution Management System 157 is a distribution system level control system that controls the devices in the substations and feeder devices (for example) for distribution grids. IP Network Services 158 is a collection of services operating on one or more servers that support IP-type communications (such as DHCP and FTP). Dispatch Mobile Data System 159 is a system that transmits/receives messages to mobile data terminals in the field. Circuit & Load Flow Analysis, Planning, Lightning Analysis and Grid Simulation Tools 152 are a collection of tools used by a utility in the design, analysis and planning for grids. IVR (integrated voice response) and Call Management 151 are systems to handle customer calls (automated or by attendants). Incoming telephone calls regarding outages may be automatically or manually entered and forwarded to the Outage Management System 155. Work Management System 150 is a system that monitors and manages work orders. Geographic Information System 149 is a database that contains information about where assets are located geographically and how the assets are connected together. If the environment has a Services Oriented Architecture (SOA), Operations SOA Support 148 is a collection of services to support the SOA environment.

One or more of the systems in the Operations Control Center 116 that are outside of the INDE Core 55 are legacy product systems that a utility may have. Examples of these legacy product systems include the Operations SOA Support 148, Geographic Information System 149, Work Management System 150, Call Management 151, Circuit & Load Flow Analysis, Planning, Lightning Analysis and Grid Simulation Tools 152, Meter Data Collection Head End(s) 153, Demand Response Management System 154, Outage Management System 155, Energy Management System 156, Distribution Management System 157, IP Network Services 158, and Dispatch Mobile Data System 159. However, these legacy product systems may not be able to process or handle data that is received from a smart grid. The INDE Core 55 may be able to receive the data from the smart grid, process the data from the smart grid, and transfer the processed data to the one or more legacy product systems in a fashion that the legacy product systems may use (such as particular formatting particular to the legacy product system). In this way, the INDE Core 55 may be viewed as a middleware.

The operations control center 116, including the INDE Core 55, may communicate with the Enterprise IT 115. Generally speaking, the functionality in the Enterprise IT 115 comprises back-office operations. Specifically, the Enterprise IT 115 may use the enterprise integration environment bus 114 to send data to various systems within the Enterprise IT 115, including Business Data Warehouse 104, Business Intelligence Applications 105, Enterprise Resource Planning 106, various Financial Systems 107, Customer Information System 108, Human Resource System 109, Asset Management System 110, Enterprise SOA Support 111, Network Management System 112, and Enterprise Messaging Services 113. The Enterprise IT 115 may further include a portal 103 to communicate with the Internet 101 via a firewall 102.

Specific Examples of Functionality in INDE Core

As shown in FIGS. 6A-C, various functionalities (represented by blocks) are included in the INDE Core 55, two of which may include meter data management services and metering analytics and services. Because of the modularity of the architecture, various functionality, such as meter data management services and metering analytics and services, may be incorporated.

INDE Substation

The INDE Substation 180 may comprise elements that are actually hosted in the substation 170 at a substation control house on one or more servers co-located with the substation electronics and systems.

Table 2 below lists and describes certain INDE Substation 180 group elements. Data security services 171 may be a part of the substation environment; alternatively, they may be integrated into the INDE Substation 180 group.

TABLE 2

INDE Substation Elements

| INDE Substation ELEMENTS | Description |
|---|---|
| Non-Operational Data Store 181 | Performance and health data; this is a distributed data historian component |
| Operational Data Store 182 | Real time grid state data; this is part of a true distributed database |
| Interface/Communications Stack 187 | Support for communications, including TCP/IP, SNMP, DHCP, SFTP, IGMP, ICMP, DNP3, IEC 61850, etc. |
| Distributed/remote computing support 186 | Support for remote program distribution, inter-process communication, etc. (DCE, JINI, OSGi for example) |
| Signal/Waveform Processing 185 | Support for real time digital signal processing components; data normalization; engineering units conversions |
| Detection/Classification Processing 184 | Support for real time event stream processing, detectors and event/waveform classifiers (ESP, ANN, SVM, etc.) |
| Substation Analytics 183 | Support for programmable real time analytics applications; DNP3 scan master; The substation analytics may allow for analysis of the real-time operational and non-operational data in order to determine if an "event" has occurred. The "event" determination may be rule-based with the rules determining whether one of a plurality of possible events occurring based on the data. The substation analytics may also allow for automatic modification of the operation of the substation based on a determined event. In this way, the grid (including various portions of the grid) may be "self-healing." This "self-healing" aspect avoids the requirement that the data be transmitted to a central authority, the data be analyzed at the central authority, and a command be sent from the central authority to the grid before the problem in the grid be corrected. In addition to the determination of the "event," the substation analytics may also generate a work-order for transmission to a central authority. The work-order may be used, for example, for scheduling a repair of a device, such as a substation. |
| Substation LAN 172 | Local networking inside the substation to various portions of the substation, such as microprocessor relays 173, substation instrumentation 174, event file recorders 175, and station RTUs 176. |
| Security services 171 | The substation may communicate externally with various utility communications networks via the security services layer. |

As discussed above, different elements within the smart grid may include additional functionality including additional processing/analytical capability and database resources. The use of this additional functionality within various elements in the smart grid enables distributed architectures with centralized management and administration of applications and network performance. For functional, performance, and scalability reasons, a smart grid involving thousands to tens of thousands of INDE Substations 180 and tens of thousands to millions of grid devices may include distributed processing, data management, and process communications.

The INDE Substation 180 may include one or more processors and one or more memory devices (such as substation non-operational data 181 and substation operations data 182). Non-operational data 181 and substation operations data 182 may be associated with and proximate to the substation, such as located in or on the INDE Substation 180. The INDE Substation 180 may further include components of the smart grid that are responsible for the observability of the smart grid at a substation level. The INDE Substation 180 components may provide three primary functions: operational data acquisition and storage in the distributed operational data store; acquisition of non-operational data and storage in the historian; and local analytics processing on a real time (such as a sub-second) basis. Processing may include digital signal processing of voltage and current waveforms, detection and classification processing, including event stream processing; and communications of processing results to local systems and devices as well as to systems at the operations control center 116. Communication between the INDE Substation 180 and other devices in the grid may be wired, wireless, or a combination of wired and wireless. For example, the transmission of data from the INDE Substation 180 to the operations control center 116 may be wired. The INDE Substation 180 may transmit data, such as operation/non-operational data or event data, to the operations control center 116. Routing device 190 may route the transmitted data to one of the operational/non-operational data bus 146 or the event bus 147.

Demand response optimization for distribution loss management may also be performed here. This architecture is in accordance with the distributed application architecture principle previously discussed.

For example, connectivity data may be duplicated at the substation 170 and at the operations control center 116, thereby allowing a substation 170 to operate independently even if the data communication network to the operations control center 116 is not functional. With this information (connectivity) stored locally, substation analytics may be performed locally even if the communication link to the operations control center is inoperative.

Similarly, operational data may be duplicated at the operations control center 116 and at the substations 170. Data from the sensors and devices associated with a particular substation may be collected and the latest measurement may be stored in this data store at the substation. The data structures of the operational data store may be the same and hence database links may be used to provide seamless access to data that resides on the substations thru the instance of the operational data store at the control center. This provides a number of advantages including alleviating data replication and enabling substation data analytics, which is more time sensitive, to occur locally and without reliance on communication availability beyond the substation. Data analytics at the operations control center level 116 may be less time sensitive (as the operations control center 116 may typically examine historical data to discern patterns that are more predictive, rather than reactive) and may be able to work around network issues if any.

Finally, historical data may be stored locally at the substation and a copy of the data may be stored at the control center. Or, database links may be configured on the repository instance at the operations control center 116, providing the operations control center access to the data at the individual substations. Substation analytics may be performed locally at the substation 170 using the local data store. Specifically, using the additional intelligence and storage capability at the substation enables the substation to analyze itself and to correct itself without input from a central authority. Alternatively, historical/collective analytics may also be performed at the operations control center level 116 by accessing data at the local substation instances using the database links.

INDE Device

The INDE Device 188 may comprise any variety of devices within the smart grid, including various sensors within the smart grid, such as various distribution grid devices 189 (e.g., line sensors on the power lines), meters 163 at the customer premises, etc. The INDE Device 188 may comprise a device added to the grid with particular functionality (such as a smart Remote Terminal Unit (RTU) that includes dedicated programming), or may comprise an existing device within the grid with added functionality (such as an existing open architecture pole top RTU that is already in place in the grid that may be programmed to create a smart line sensor or smart grid device). The INDE Device 188 may further include one or more processors and one or more memory devices.

Existing grid devices may not be open from the software standpoint, and may not be capable of supporting much in the way of modern networking or software services. The existing grid devices may have been designed to acquire and store data for occasional offload to some other device such as a laptop computer, or to transfer batch files via PSTN line to a remote host on demand. These devices may not be designed for operation in a real time digital network environment. In these cases, the grid device data may be obtained at the substation level 170, or at the operations control center level 116, depending on how the existing communications network has been designed. In the case of meters networks, it will normally be the case that data is obtained from the meter data collection engine, since meter networks are usually closed and the meters may not be addressed directly. As these networks evolve, meters and other grid devices may be individually addressable, so that data may be transported directly to where it is needed, which may not necessarily be the operations control center 116, but may be anywhere on the grid.

Devices such as faulted circuit indicators may be married with wireless network interface cards, for connection over modest speed (such as 100 kbps) wireless networks. These devices may report status by exception and carry out fixed pre-programmed functions. The intelligence of many grid devices may be increased by using local smart RTUs. Instead of having poletop RTUs that are designed as fixed function, closed architecture devices, RTUs may be used as open architecture devices that can be programmed by third parties and that may serve as an INDE Device 188 in the INDE Reference Architecture. Also, meters at customers' premises may be used as sensors. For example, meters may measure consumption (such as how much energy is consumed for purposes of billing) and may measure voltage (for use in volt/VAr optimization).

FIGS. 6A-C further depicts customer premises 179, which may include one or more Smart Meters 163, an in-home display 165, one or more sensors 166, and one or more controls 167. In practice, sensors 166 may register data at one or more devices at the customer premises 179. For example, a sensor 166 may register data at various major appliances within the customer premises 179, such as the furnace, hot water heater, air conditioner, etc. The data from the one or more sensors 166 may be sent to the Smart Meter 163, which may package the data for transmission to the operations control center 116 via utility communication network 160. The in-home display 165 may provide the customer at the customer premises with an output device to view, in real-time, data collected from Smart Meter 163 and the one or more sensors 166. In addition, an input device (such as a keyboard) may be associated with in-home display 165 so that the customer may communicate with the operations control center 116. In one embodiment, the in-home display 165 may comprise a computer resident at the customer premises.

The customer premises 165 may further include controls 167 that may control one or more devices at the customer premises 179. Various appliances at the customer premises 179 may be controlled, such as the heater, air conditioner, etc., depending on commands from the operations control center 116.

As depicted in FIGS. 6A-C, the customer premises 169 may communicate in a variety of ways, such as via the Internet 168, the public-switched telephone network (PSTN) 169, or via a dedicated line (such as via collector 164). Via any of the listed communication channels, the data from one or more customer premises 179 may be sent. As shown in FIGS. 6A-C, one or more customer premises 179 may comprise a Smart Meter Network 178 (comprising a plurality of smart meters 163), sending data to a collector 164 for transmission to the operations control center 116 via the utility management network 160. Further, various sources of distributed energy generation/storage 162 (such as solar panels, etc.) may send data to a monitor control 161 for communication with the operations control center 116 via the utility management network 160.

As discussed above, the devices in the power grid outside of the operations control center 116 may include processing and/or storage capability. The devices may include the INDE Substation 180 and the INDE Device 188. In addition to the individual devices in the power grid including additional intelligence, the individual devices may communicate with other devices in the power grid, in order to exchange information (include sensor data and/or analytical data (such as event data)) in order to analyze the state of the power grid (such as determining faults) and in order to change the state of the power grid (such as correcting for the faults). Specifically, the individual devices may use the following: (1) intelligence (such as processing capability); (2) storage (such as the distributed storage discussed above); and (3) communication (such as the use of the one or more buses discussed above). In this way, the individual devices in the power grid may communicate and cooperate with one another without oversight from the operations control center 116.

For example, the INDE architecture disclosed above may include a device that senses at least one parameter on the feeder circuit. The device may further include a processor that monitors the sensed parameter on the feeder circuit and that analyzes the sensed parameter to determine the state of the feeder circuit. For example, the analysis of the sense parameter may comprise a comparison of the sensed parameter with a predetermined threshold and/or may comprise a trend analysis. One such sensed parameter may include sensing the waveforms and one such analysis may comprise determining whether the sensed waveforms indicate a fault on the feeder circuit. The device may further communicate with one or more substations. For example, a particular substation may supply power to a particular feeder circuit. The device may sense the state of the particular feeder circuit, and determine whether there is a fault on the particular feeder circuit. The device may communicate with the substation. The substation may analyze the fault determined by the device and may take corrective action depending on the fault (such as reducing the power supplied to the feeder circuit). In the example of the device sending data indicating a fault (based on analysis of waveforms), the substation may alter the power supplied to the feeder circuit without input from the operations control center 116. Or, the substation may combine the data indicating the fault with information from other sensors to further refine the analysis of the fault. The substation may further communicate with the operations control center 116, such as the outage intelligence application and/or the fault intelligence application. Thus, the operations control center 116 may determine the fault and may determine the extent of the outage (such as the number of homes affected by the fault). In this way, the device sensing the state of the feeder circuit may cooperatively work with the substation in order to correct a potential fault with or without requiring the operations control center 116 to intervene.

As another example, a line sensor, which includes additional intelligence using processing and/or memory capability, may produce grid state data in a portion of the grid (such as a feeder circuit). The grid state data may be shared with the demand response management system 155 at the operations control center 116. The demand response management system 155 may control one or more devices at customer sites on the feeder circuit in response to the grid state data from the line sensor. In particular, the demand response management system 155 may command the energy management system 156 and/or the distribution management system 157 to reduce load on the feeder circuit by turning off appliances at the customer sites that receive power from the feeder circuit in response to line sensor indicating an outage on the feeder circuit. In this way, the line sensor in combination with the demand response management system 155 may shift automatically load from a faulty feeder circuit and then isolate the fault.

As still another example, one or more relays in the power grid may have a microprocessor associated with it. These relays may communicate with other devices and/or databases resident in the power grid in order to determine a fault and/or control the power grid.

The foregoing examples focused on a power utility application. The disclosed INDE Architecture may be applied to different industries as well. For example, the disclosed INDE Architecture may be customizable and applied to the one or more industries, including without limitation, the vehicle travel industry (such as air travel network, rail travel network, automobile travel network, bus travel network, etc.), telecommunication networks and energy exploration (such as a network of oil wells, a network of natural gas wells, etc.).

While this invention has been shown and described in connection with the preferred embodiments, it is apparent that certain changes and modifications in addition to those mentioned above may be made from the basic features of this invention. In addition, there are many different types of computer software and hardware that may be utilized in practicing the invention, and the invention is not limited to the examples described above. The invention was described with reference to acts and symbolic representations of operations that are performed by one or more electronic devices. As such, it will be understood that such acts and operations include the manipulation by the processing unit of the electronic device of electrical signals representing data in a structured form. This manipulation transforms the data or maintains it at locations in the memory system of the electronic device, which reconfigures or otherwise alters the operation of the electronic device in a manner well understood by those skilled in the art. The data structures where data is maintained are physical locations of the memory that have particular properties defined by the format of the data. While the invention is described in the foregoing context, it is not meant to be limiting, as those of skill in the art will appreciate that the acts and operations described may also be implemented in hardware. Accordingly, it is the intention of the Applicants to protect all variations and modification within the valid scope of the present invention. It is intended that the invention be defined by the following claims, including all equivalents.

The invention claimed is:

1. A central power grid system for managing at least a part of a power grid and for communicating with a plurality of meter data management systems and with a plurality of headend systems, the meter data management systems generating commands and the headend systems communicating with one or more meters, the central power grid system comprising:
    a computing device including a processor and a memory configured to execute:
    a gateway layer comprising a plurality of input connector routines and a plurality of output connector routines, the plurality of input connector routines comprising at least one separate input connector routine for communicating with each of a plurality of source systems that send data to the central power grid system, the source systems comprising the plurality of meter data management systems that send data to the central power grid system, the plurality of output connector routines comprising at least one separate output connector routine for communicating with each of a plurality of target systems, the target systems comprising the plurality of headend systems that receive data from the central power grid system; and
    a core layer in communication with the gateway layer but not with the source and target systems, the core layer comprising a plurality of core adapters, the core adapters configured to perform a one-to-one translation of communications received from the plurality of source systems by the gateway layer such as to be adapted for receipt by the plurality of target systems.

2. The central power grid system of claim 1, wherein the data sent to the central power grid system comprises a connect/disconnect command sent by the plurality of meter data management systems.

3. The central power grid system of claim 1, wherein the data sent to the central power grid system comprises an on-demand meter read command sent by the plurality of meter data management systems.

4. The central power grid system of claim 1, wherein the plurality of input connector routines comprises a plurality of separate input connector routines for communicating with the plurality of meter data management systems; and
    wherein the plurality of output connector routines comprises a plurality of separate output connector routines for communicating with the plurality of headend systems.

5. The central power grid system of claim 4, wherein each of the meter data management systems are associated with a plurality of separate input connector routines; and
    wherein each of the headend systems are associated with a plurality of separate output connector routines.

6. The central power grid system of claim 5, wherein the plurality of separate input connector routines associated with each of the meter data management systems comprise different network protocols.

7. The central power grid system of claim 6, wherein the different network protocols are selected from the group consisting of file transfer protocol (FTP), java message service (JMS), and hypertext transfer protocol (HTTP).

8. The central power grid system of claim 4, wherein the plurality of input connector routines further comprise at least one separate input connector routine for communicating with each of the plurality of headend systems; and
    wherein the plurality of output connector routines further comprise at least one output connector routine for communicating with each of the plurality of meter data management systems.

9. The central power grid system of claim 8, wherein each of the headend systems is associated with a separate input connector routine; and wherein each of the meter data management systems is associated with a separate output connector routine.

10. The central power grid system of claim 1, further comprising a connector services interface layer for interfacing between the gateway layer and the core layer, the connector services interface layer invoking the core layer in response to receipt of a communication by the gateway layer.

11. The central power grid system of claim 1, wherein the core adapters are further configured to perform a one-to-one translation of communications from each of the plurality of the source systems to each of the plurality of target systems.

12. The central power grid system of claim 11,
wherein the core adapters are configured to perform a one-to-one translation of communications from each of the plurality of the meter data management systems to each of the plurality of headend systems.

13. The central power grid system of claim 12, wherein the core adapters are further configured to perform a one-to-one translation of communications from each of the plurality of the headend systems to each of the plurality of meter data management systems.

14. A central power grid system for managing at least a part of a power grid and for communicating with a plurality of meter data management systems and with a plurality of headend systems, the meter data management systems generating commands and the headend systems communicating with one or more meters, the central power grid system comprising:
a computing device including a processor and a memory configured to execute:
a gateway layer comprising a plurality of input connector routines and a plurality of output connector routines, the plurality of input connector routines comprising at least one separate input connector routine for communicating with each of a plurality of source systems that send data to the central power grid system, the source systems comprising the plurality of headend systems that send data to the central power grid system, the plurality of output connector routines comprising at least one separate output connector routine for communicating with each of a plurality of target systems, the target systems comprising the plurality of meter data management systems that receive data from the central power grid system; and
a core layer in communication with the gateway layer but not with the source and target systems, the core layer comprising a plurality of core adapters, the core adapters configured to perform a one-to-one translation of communications received from the plurality of source systems by the gateway layer such as to be adapted for receipt by the plurality of target systems.

15. The central power grid system of claim 14, further comprising a connector services interface layer for interfacing between the gateway layer and the core layer, the connector services interface layer invoking the core layer in response to receipt of a communication by the gateway layer.

16. The central power grid system of claim 14, wherein the core adapters are further configured to perform a one-to-one translation of communications from each of the plurality of the source systems to each of the plurality of target systems.

17. The central power grid system of claim 14, wherein the data sent to the central power grid authority system comprises a periodic meter read sent by the plurality of headend systems.

18. The central power grid system of claim 14, wherein the plurality of input connector routines comprises a plurality of separate input connector routines for communicating with the plurality of headend systems; and
wherein the plurality of output connector routines comprises a plurality of separate output connector routines for communicating with the plurality of meter data management systems.

* * * * *